(12) United States Patent
Miller et al.

(10) Patent No.: US 11,428,313 B2
(45) Date of Patent: Aug. 30, 2022

(54) DETENT DEVICE AND TRANSMISSION

(71) Applicant: ZF Friedrichshafen AG, Friedrichshafen (DE)

(72) Inventors: Martin Miller, Immenstaad am Bodensee (DE); Bernd Lutz, Uhldingen-Mühlhofen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 41 days.

(21) Appl. No.: 16/874,919

(22) Filed: May 15, 2020

(65) Prior Publication Data

US 2020/0362963 A1    Nov. 19, 2020

(30) Foreign Application Priority Data

May 17, 2019 (DE) ...................... 10 2019 207 249.6

(51) Int. Cl.
 *B60K 20/00*  (2006.01)
 *G05G 5/00*  (2006.01)
 *F16H 61/18*  (2006.01)

(52) U.S. Cl.
 CPC ....... *F16H 61/18* (2013.01); *F16H 2061/185* (2013.01)

(58) Field of Classification Search
 CPC .... F16H 61/18; F16H 2061/185; F16H 63/38; F16H 63/3408; F16H 63/34
 See application file for complete search history.

(56) References Cited

U.S. PATENT DOCUMENTS

| | | | | |
|---|---|---|---|---|
| 3,354,738 A | * | 11/1967 | Ivanchich | F16H 3/095 74/330 |
| 4,359,910 A | * | 11/1982 | Numazawa | F16H 61/18 74/473.24 |
| 4,406,356 A | * | 9/1983 | Prince | B60W 30/18 192/13 R |
| 4,503,727 A | * | 3/1985 | Ballendux | F16H 63/16 475/209 |
| 4,651,848 A | * | 3/1987 | Kobayashi | B60K 17/344 180/247 |

(Continued)

FOREIGN PATENT DOCUMENTS

DE  10 2008 042 957 A1  4/2010

*Primary Examiner* — Jake Cook
(74) *Attorney, Agent, or Firm* — Finch & Maloney PLLC (57) ABSTRACT

A detent device for a transmission, having a shifting element, first and second end-position retaining configurations arranged at first and second positions, respectively, on the shifting element, the second position is different from the first, and a neutral retaining configuration arranged on the shifting element at a third position different from the first and second positions. A latching first detent element which, depending on the position of the shifting element, latches either at the first or second end positions in the first or second end-position retaining configurations, respectively, and another latching detent element, which latches in the neutral retaining configuration when the shifting element is in its neutral position. The neutral retaining configuration has a retaining contour which is designed and/or orientated differently on the shifting element from the first end-position retaining configuration and from the second end-position retaining configuration. A transmission with a detent device.

16 Claims, 4 Drawing Sheets

(56) References Cited

U.S. PATENT DOCUMENTS

| | | | | |
|---|---|---|---|---|
| 6,026,698 A | * | 2/2000 | Weston | ............... F16H 3/0915 |
| | | | | 74/335 |
| 6,026,702 A | * | 2/2000 | Dreier | ................. F16H 63/206 |
| | | | | 74/473.21 |
| 2011/0303033 A1 | * | 12/2011 | Bai | ........................ F16H 61/30 |
| | | | | 74/335 |

* cited by examiner

DETENT DEVICE AND TRANSMISSION

This application claims priority from German patent application serial no. 10 2019 207 249.6 filed May 17, 2019.

FIELD OF THE INVENTION

The present invention relates to a detent device for a transmission, which comprises a shifting element, a first end-position retaining configuration arranged at a first position on the shifting element, a second end-position retaining configuration arranged at a second position on the shifting element different from the first position, and a neutral retaining configuration arranged at a third position different from the first position and from the second position, and further, comprises a latching first detent element which is designed, depending on the position of the shifting element, either to latch with interlock into the first end-position retaining configuration at a first end-position of the shifting element or to latch with interlock into the second end-position retaining configuration at a second end-position of the shifting element, and a latching second detent element different from the first detent element, which is designed to latch with interlock into the neutral retaining configuration when the shifting element is in its neutral position. The invention also relates to a transmission having such a detent device.

BACKGROUND OF THE INVENTION

DE 10 2008 042 957 A1 describes a shifting arrangement with a neutral position retaining configuration, comprising a detent element which, in the engaged condition of the neutral position retaining configuration, is pressed with some pre-stress onto a shifting rail of the shifting arrangement. The shifting rail has a depression into which the detent element engages in the neutral position. As soon as the shifting rail gets to the neutral position the detent element latches with interlock in the depression and holds the shifting rail in the neutral position. The pre-stress on the detent element is produced by a compression spring or by an electromagnet acting on the detent element. There, the pre-stress on the detent element and hence the retaining force are chosen such that they are not overcome by an actuation force for shifting the shifting arrangement. In this way the shifting arrangement is locked or blocked in the neutral position. In addition to this neutral position locking, the end-positions of the shifting arrangement are locked there by separate detent devices.

SUMMARY OF THE INVENTION

The purpose of the present invention is to provide a detent device for a transmission, which is designed to work particularly reliably.

The objective is achieved by a detent device having the features specified in the independent claim(s). In addition the objective is achieved by a transmission comprising such a detent device and having the features specified in the independent claim(s). Advantageous further developments are the object of the dependent claims. Moreover, further features in the following description can if appropriate represent additional solutions according to the invention.

The detent device according to the invention for a transmission comprises a shifting element, a first end-position retaining configuration arranged on the shifting element at a first position, a second end-position retaining configuration arranged on the shifting element at a second position different from the first position, and a neutral retaining configuration arranged on the shifting element at a third position different from the first position and the second position, and in addition the detent device comprises a latching first detent element which is designed, depending on the position of the shifting element, either to latch with interlock into the first end-position retaining configuration at a first end-position of the shifting element or to latch with interlock into the second end-position retaining configuration at a second end-position of the shifting element, and in addition a latching second detent element different from the first detent element, which is designed to latch with interlock into the neutral retaining configuration when the shifting element is in its neutral position, wherein the neutral retaining configuration has a detent contour of different design and/or different orientation from the first end-position retaining configuration and the second end-position retaining configuration on the shifting element.

For the automatic engagement of a gear, as a rule detent devices are used which in particular can have three shifting positions. These are generally a first shifting position and another, second shifting position, and a third shifting position usually between the first and second shifting positions, which is a neutral position. In particular the shifting elements used are most often shifting rails which can move to and fro in order to change between the first shifting position and the second shifting position and, when necessary, can select a neutral position as well. To produce an automatically driven shifting rail designed to adopt three shifting positions, corresponding three-position cylinders are usually used. Such multi-position cylinders can generally be driven hydraulically or pneumatically in order to be able to drive the shifting element or shifting rail by virtue of a movement of a piston and a piston rod of the multi-position cylinder. However, three-position cylinders are of complex design and are more expensive, for example, than more simply designed two-position cylinders.

In accordance with their intended use, however, two-position cylinders can only adopt exactly two different shifting positions, namely in most cases a first end-position and a second end-position. Accordingly, a two-position cylinder lacks the ability to adopt a third shifting position with precision, such as the already mentioned neutral position. It is true that two-position cylinders can be operated in a pressure-modulated manner so that they can also move to a position different from the first and second end-positions, but with less positional accuracy. There is then also a risk that once the intermediate position has been adopted, it cannot be maintained accurately over long periods.

In order to be able to move to and maintain a first end-position, a second end-position and a neutral position with positional accuracy, a detent element can engage with the shifting element or on the shifting rail, which detent element, in the respective shifting position, engages in a first end-position retaining configuration on the shifting element, in a second end-position retaining configuration on the shifting element, or in a neutral retaining configuration on the shifting element. If only a single detent element is provided, the two end-position retaining configurations and the neutral retaining configuration must be identically designed and must have the same orientation relative to the single detent element, since all three of them must in each case be able to co-operate with the single detent element.

Although in DE 10 2008 042 957 A1 a second detent element is provided for the neutral retaining configuration, the first end-position retaining configuration, the second end-position retaining configuration and the neutral retaining configuration on the shifting rail are identically designed and orientated. The second detent element for the neutral retaining configuration can also be adjusted by means of an actuator in order to be able to optionally latch into a neutral position retaining configuration so that depending on the position of the shifting rail, the second detent element can rest against the outer surface of the shifting rail or latch into the neutral retaining configuration, or be deactivated in such manner that the detent element is moved completely away from the shifting rail so that the second detent element cannot come into contact with the outer surface of the shifting rail at all. Such a second detent element driven by an actuator is also very complex, similarly to a three-position cylinder, since it requires an additional actuator such as an electromagnetic actuator, in particular a lifting magnet.

Since according to the invention the neutral retaining configuration has a retaining contour with a contour and/or orientation on the shifting element different from the retaining contour of the first end-position retaining configuration and the second end-position retaining configuration, the retaining behavior, in particular a retaining force of the neutral retaining configuration can be configured differently from the retaining behavior, in particular a retaining force of the two end-position retaining configurations. This can be done using simple mechanical means, such as mechanical spring devices, in particular spiral springs, so that elaborately designed and/or expensive actuators are not needed.

Different retaining behaviors of the neutral retaining configuration and of the end-position retaining configurations can be established by designing the retaining contours of the neutral retaining configuration and the end-position retaining configurations differently, in particular in combination with different orientations of the neutral retaining configuration and the end-position retaining configurations on the shifting element, and/or different pre-stress forces (spring devices).

The shifting element can preferably be a shifting rail that is displaced linearly along its length, which has an outside surface in which a first depression that forms the first end-position retaining configuration is produced at a first axial position along the length of the shifting rail, and in which a second depression that forms the second end-position retaining configuration is produced at a second axial position along the length of the shifting rail, which is arranged axially offset from the first axial position of the first depression, and in which a third depression that forms the neutral retaining configuration is produced at a third axial position along the length of the shifting rail, which is axially offset from the first axial position of the first depression and also from the second axial position of the second depression.

The first, second and third depressions are in this case in the form of locally delimited depressions, i.e. the depressions do not extend around a circumference of the shifting rail as for example would be the case with all-round grooves. In fact, it must be ensured that with regard to the two separate detent elements provided according to the invention (the first detent element and the second detent element), each detent element only latches into the respective retaining configuration associated with it. Thus, the first detent element should only be able to latch into the first end-position retaining configuration and into the second end-position retaining configuration (without the first detent element being able to latch into the neutral retaining configuration) and the second detent element should only be able to latch into the neutral retaining configuration (without the second detent element being able to latch into the two end-position retaining configurations).

The neutral retaining configuration can in its third position be arranged in the axial direction between the first axial position of the first depression and the second axial position of the second depression on the shifting rail, with an orientation relative to the length of the shifting rail which is different from the orientations of the first and second depressions.

The retaining contour of the neutral retaining configuration, specifically the third depression in the shifting rail, can in particular be arranged on the shifting element, namely the shifting rail, so that its orientation differs by 90 degrees or by 180 degrees from the orientations of the retaining contours of the first end-position retaining configuration, namely the first depression in the shifting rail, and of the second end-position retaining configuration, namely the second depression in the shifting rail. Among other things this has the advantage that the first detent element and the second detent element can be positioned very close to one another in the axial direction and in particular the first and second detent elements can then even be arranged at the same axial level on the shifting rail, since the first detent element and the second detent element in their orientations are offset relative to one another and therefore do not mutually interfere in the occupation of space.

From this it also follows that a neutral retaining configuration can be formed on the shifting rail even between two end-position retaining configurations vary close to one another in the axial direction of the shifting rail. Accordingly, the retaining contour of the neutral retaining configuration can if necessary be made even larger, in particular axially wider, than the axial distance between the first end-position retaining configuration and the second end-position retaining configuration.

The second detent element, which is designed to latch with interlock into the retaining contour of the neutral retaining configuration, can therefore be arranged with an orientation which differs, in particular by 90 degrees or 180 degrees, from the orientation of the first detent element, which latter is designed to latch with interlock into the retaining contours of the first end-position and the second end-position retaining configurations.

The retaining contour of the neutral retaining configuration, namely the third depression in the shifting rail, can be designed differently, in such manner that the retaining contour of the neutral retaining configuration, namely the third depression in the shifting rail, has at least one side surface orientated in an operating direction of the shifting element which is steeper than the side surfaces of the first end-position retaining configuration and/or the second end-position retaining configuration orientated in the operating direction of the shifting element.

By virtue of a steeper side surface in the neutral retaining configuration, particularly positionally stable neutral retention can be achieved, with which relatively large shifting forces are needed in order to move the second detent element out of the neutral retaining configuration. Thus, once a neutral retaining position has been reached it is maintained particularly securely. By contrast, a less steep shape of the side surfaces at the two end-position retaining configurations enables shifting in the transmission to take place with particularly small shifting forces.

Accordingly, the second detent element can have a counter-latching contour that co-operates with the retaining contour of the neutral retaining configuration, which is designed differently from the counter-latching contour of the first detent element, such that the counter-latching contour of the second detent element has at least one side surface orientated in the operating direction of the shifting element which is steeper than the side surface of the counter-latching contour of the first detent element orientated in the operating direction of the shifting element.

The first detent element can be fitted spring-loaded toward the shifting element by means of a first spring device and the second detent element can then be fitted spring-loaded toward the shifting element by means of a second spring device, wherein the second spring device has a higher spring stiffness than the first spring device. By virtue of the spring loading of the second detent element with a higher spring stiffness, higher retaining forces act on the neutral retaining configuration than the retaining forces by the first detent element at the two end-position retaining configurations. Accordingly, the second detent element can latch particularly reliably in the neutral retaining configuration.

Associated with the second detent element there can be a locking element designed to secure the second detent element against being pushed out of the neutral retaining configuration when the second detent element has latched into the neutral retaining configuration and the shifting element is moved.

Associated with the second detent element there can be a sensor designed to detect the position of the second detent element.

The detent device can comprise a two-position cylinder operated by pressure modulation, designed to move the shifting element, specifically the shifting rail, so that during a displacement of the shifting element, specifically the shifting rail, automatically controlled by the two-position cylinder between the first end-position retaining configuration and the second end-position retaining configuration, the neutral retaining configuration can be found.

The invention also relates to a transmission, which comprises a shifting arrangement for shifting the transmission between at least a first shift condition and at least a second shift condition, such that the shifting arrangement comprises a detent device according to one or more of the embodiments described, if necessary also in combination with one another.

The shifting arrangement of the transmission can in particular be designed for shifting an automated transmission, a range group or a splitter group of a group transmission and/or a respective reversing gear shift, in each case into a neutral position.

BRIEF DESCRIPTION OF THE DRAWINGS

Specific example embodiments of the invention are explained in greater detail in the figure descriptions given below, which relate to the attached figures. Specific features of these example embodiments, which represent general features of the invention, can if appropriate be considered individually or in other combinations of features regardless of the specific connection in which they are mentioned.

The figures show.

DETAILED DESCRIPTION OF THE PREFERRED EMBODIMENTS

Figure 2:
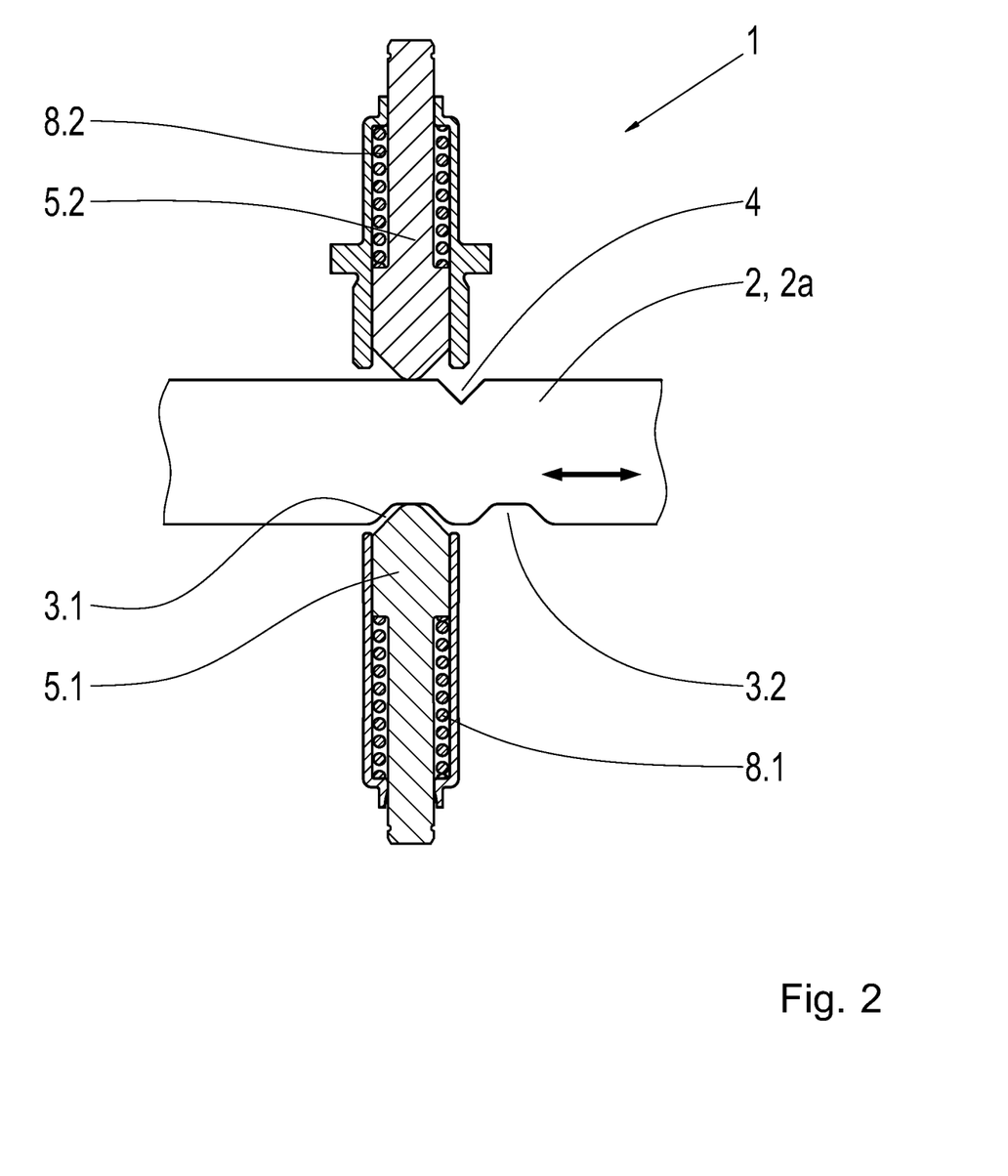
FIG. 2: The first embodiment of a detent device, with the first and second detent elements as in FIG. 1 and with the first detent element latched into one of the two end-position retaining configurations.
Figure 3:
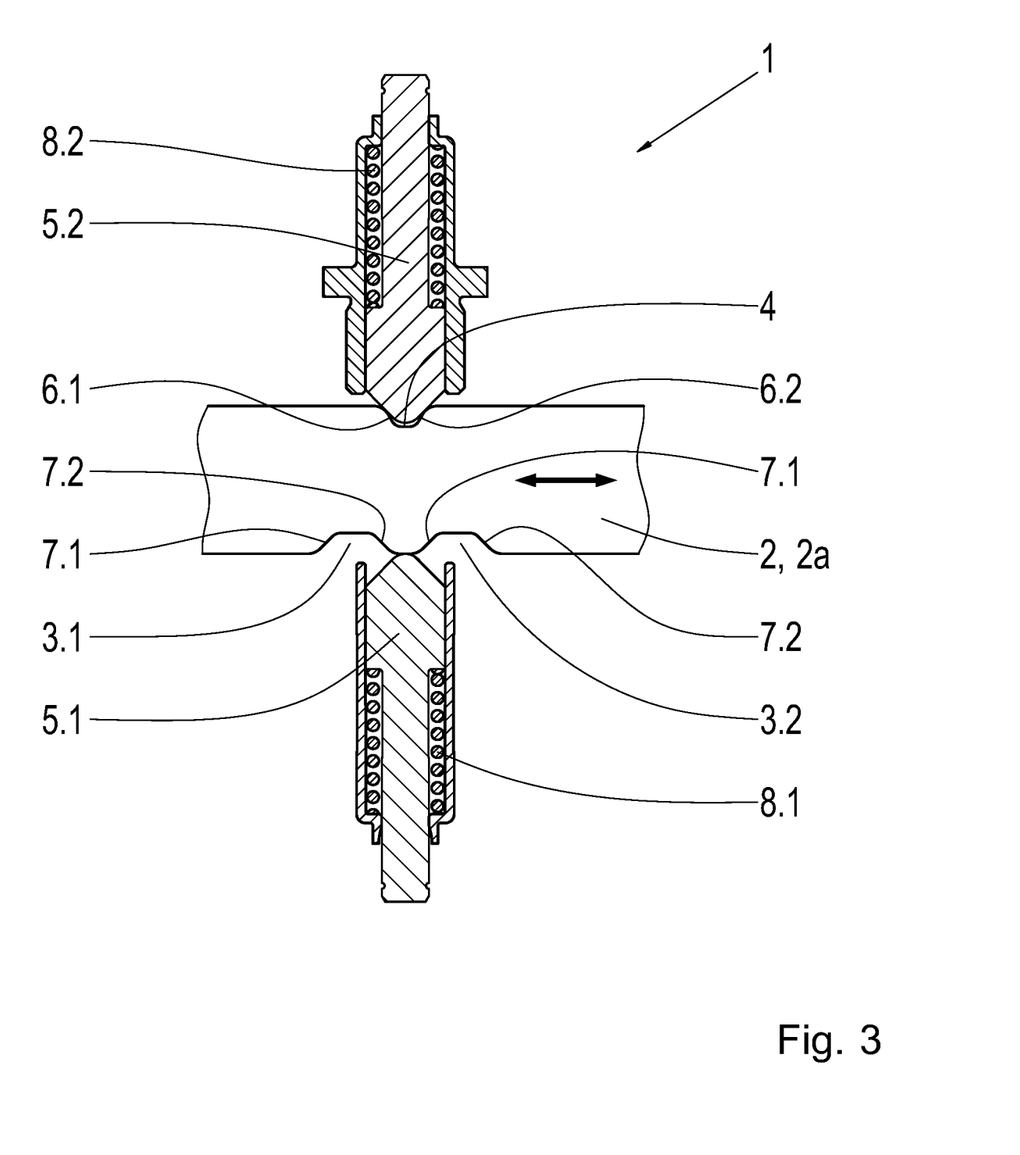
FIG. 3: A second embodiment of a detent device with a first and a second detent element, which are orientated differently from one another, with the second detent element latched into a neutral retaining configuration which has steeper side surfaces than the end-position retaining configurations.
Figure 4:
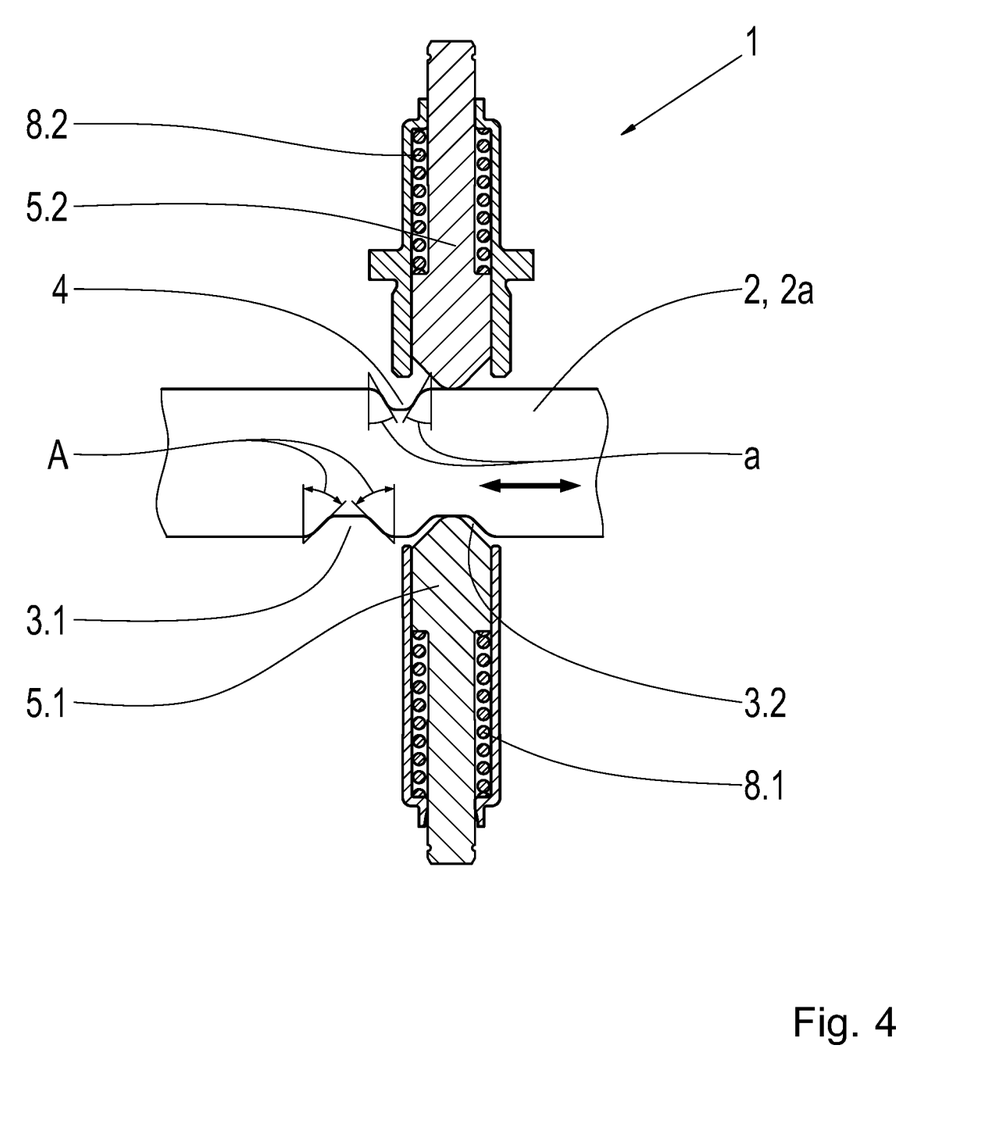
FIG. 4: The second embodiment of a detent device with the first and second detent elements as in FIG. 3 and the first detent element latched into one of the two end-position retaining configurations, which have less steep side surfaces than the neutral retaining configuration.

The detent device 1 shown in FIGS. 1 to 4 comprises in each case a shifting element 2, a first end-position retaining configuration 3.1 arranged at a first position on the shifting element 2, a second end-position retaining configuration 3.2 arranged at a second position different from the first position on the shifting element, and a neutral retaining configuration 4 arranged on the shifting element at a third position different from the first position and from the second position. The detent device 1 further comprises a latching first detent element 5.1 which, depending on the position of the shifting element 2, is designed to latch with interlock either, in a first end position of the shifting element 2, in the first end-position retaining configuration 3.1 (FIG. 2), or in a second end position of the shifting element 2, in the second end-position retaining configuration 3.2 (FIG. 4).

Figure 1:
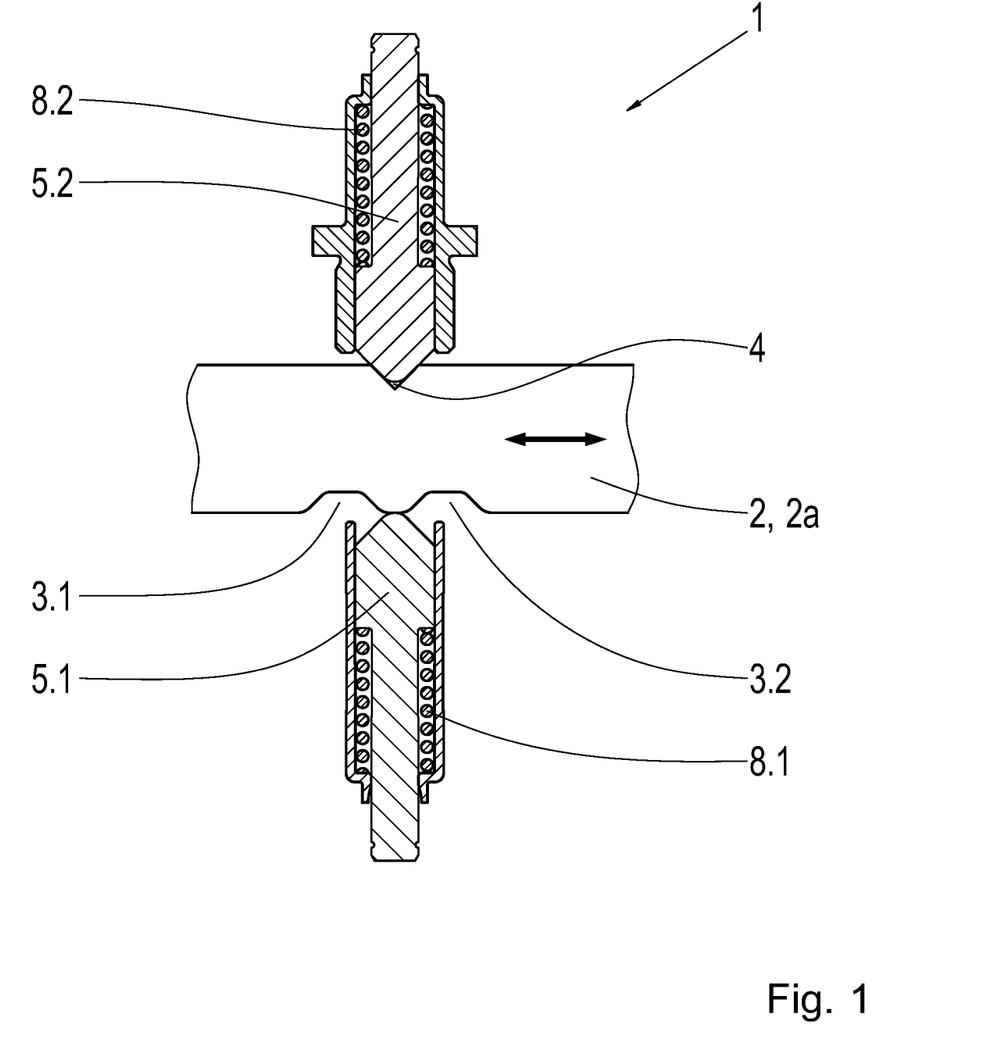
FIG. 1: A first embodiment of a detent device with a first and a second detent element, which are arranged with orientations different from one another and with the second detent element latched into the neutral retaining configuration.

The detent device 1 also comprises a latching second detent element 5.2 different from the first detent element 5.1 and which is designed to latch with interlock in the neutral retaining configuration 4 when the shifting element 2 is in its neutral position (FIG. 1, FIG. 3). The neutral retaining configuration 4 has a retaining contour designed differently from the retaining contours of the first end-position retaining configuration 3.1 and the second end-position retaining configuration 3.2 (FIG. 3, FIG. 4) and/or a different orientation (FIGS. 1 to 4) on the shifting element 2.

In the two embodiments shown in FIGS. 1 and 2 and in FIGS. 3 and 4 respectively, the shifting element 2 is in the form of a shifting rail 2a that moves linearly in its longitudinal direction.

In the first embodiment according to FIGS. 1 and 2, although the retaining contours of the neutral retaining configuration 4, the first end-position retaining configuration 3.1 and the second end-position retaining configuration 3.2 are identical, the neutral retaining configuration 4 or the retaining contour of the neutral retaining configuration 4 is orientated differently from the orientations of the first and second end-position retaining configurations 3.1 and 3.2, namely in the example embodiment shown in an orientation rotated by 180 degrees around the axial length, i.e. around the operating direction of the shifting element 2. To put it differently, in the case of this example embodiment the neutral retaining configuration 4 is arranged on the opposite side of the shifting element 2 relative to the first and second end-position retaining configurations 3.1 and 3.2. Thus, the neutral retaining configuration 4 faces the opposite way relative to the orientation of the first and second end-position retaining configurations 3.1 and 3.2. Accordingly, the first and second end-position retaining configurations 3.1 and 3.2 face toward the same direction and co-operate with the same detent element 5.1, namely the first detent element.

In the second embodiment according to FIGS. 3 and 4, as in the first embodiment the neutral retaining configuration 4 or the retaining contour of the neutral retaining configuration 4 is again orientated differently from the orientation of the first and second end-position retaining configurations 3.1 and 3.2, and in the case of the second example embodiment shown, again in an orientation rotated by 180 degrees around the axial length, i.e. around the operating direction of the shifting element 2. However, the neutral retaining configuration 4 is designed differently from the first and second end-position retaining configurations 3.1 and 3.2. In the case of the example embodiment shown, the design of the neutral retaining configuration 4 differs from the design of the first and second end-position retaining configurations 3.1 and 3.2 in that the retaining contour of the neutral retaining configuration 4 has side surfaces 6.1 and 6.2 which are steeper than the side surfaces 7.1 and 7.2 of the first and second end-position retaining configurations 3.1 and 3.2. Accordingly, the side-surface angles a of the side surfaces 6.1 and 6.2 of the neutral retaining configuration 4 are smaller, i.e. steeper than the side-surface angles A of the side surfaces 7.1 and 7.2 of the first end-position retaining configuration 3.1 and/or the second retaining configuration 3.2.

In the two embodiments shown in FIGS. 1 and 2 or FIGS. 3 and 4, respectively, the first detent element 5.1 is spring-loaded by a first spring device 8.1 toward the shifting element 2 and the second detent element 5.2 is spring-loaded by a second spring device 8.2 toward the shifting element 2, such that the second spring device 8.2 has greater spring stiffness than the first spring device 8.1.

INDEXES

1 Detent device
2 Shifting element
2a Shifting rail
3.1 First end-position retaining configuration
3.2 Second end-position retaining configuration
4 Neutral retaining configuration
5.1 First detent element
5.2 Second detent element
6.1, 6.2 Side surfaces
7.1, 7.2 Side surfaces
8.1 First spring device
8.2 Second spring device

The invention claimed is:

1. A detent device for a transmission comprising:
a shifting element having a first end-position retaining configuration arranged at a first position on the shifting element, a second end-position retaining configuration arranged on the shifting element at a second position different from the first position, and a neutral retaining configuration arranged on the shifting element at a third position different from the first position and the second position;
a first latching detent element configured, depending on a position of the shifting element, to latch with interlock either at a first end position of the shifting element in the first end-position retaining configuration or at a second end position of the shifting element in the second end-position retaining configuration; and
a second latching detent element, different from the first latching detent element, the second latching detent element configured to latch with interlock in the neutral retaining configuration when the shifting element is in a neutral position,
wherein the neutral retaining configuration has a retaining contour that is different from the first end-position retaining configuration and from the second end-position retaining configuration.

2. The detent device according to claim 1, wherein the shifting element is a shifting rail configured to move linearly along a length thereof, the shifting rail having an outer surface in which a first depression, that forms the first end-position retaining configuration, is formed at a first axial position along the length of the shifting rail and in which a second depression, that forms the second end-position retaining configuration, is formed at a second axial position along the length of the shifting rail, wherein the second depression is arranged axially offset relative to the first axial position of the first depression, and in which a third depression, that forms the neutral retaining configuration, is formed at a third axial position along the length of the shifting rail which is arranged axially offset relative to the first axial position of the first depression and to the second axial position of the second depression.

3. The detent device according to claim 2, wherein the neutral retaining configuration is arranged in the third axial position in an axial direction between the first axial position of the first depression and the second axial position of the second depression on the shifting rail, in an orientation around the shifting rail which differs from orientations of the first depression and of the second depression about the length of the shifting rail.

4. The detent device according to claim 1, wherein the retaining contour of the neutral retaining configuration is arranged at an orientation on the shifting element which differs either by 90 degrees or by 180 degrees from an orientation of retaining contours of the first end-position retaining configuration and of the second end-position retaining configuration.

5. The detent device according to claim 1, wherein the second latching detent element, designed to latch with interlock in the retaining contour of the neutral retaining configuration, is arranged at an orientation different from an orientation of the first latching detent element configured to latch with interlock in retaining contours of the first end-position retaining configuration and of the second end-position retaining configuration.

6. The detent device according to claim 1, wherein the retaining contour of the neutral retaining configuration has at least one side surface orientated in an operating direction of the shifting element, which is steeper than side surfaces of at least one of the first end-position retaining configuration and the second end-position retaining configuration orientated in the operating direction of the shifting element.

7. The detent device according to claim 1, wherein the second latching detent element has a counter-latching contour that cooperates with the retaining contour of the neutral retaining configuration, the counter-latching contour of the second latching detent element different from a counter-latching contour of the first latching detent element in that the counter-latching contour of the second latching detent element has at least one side surface orientated in an operating direction of the shifting element which is steeper than a side surface of the counter-latching contour of the first latching detent element orientated in the operating direction of the shifting element.

8. The detent device according to claim 1, wherein the first latching detent element is spring-loaded toward the shifting element by a first spring device and the second latching detent element is spring-loaded toward the shifting element by a second spring device, and the second spring device has higher spring stiffness than a spring stiffness of the first spring device.

9. The detent device according to claim 1, wherein the second latching detent element is associated with a locking element configured to secure the second latching detent element against being pushed out of the neutral retaining configuration when the second latching detent element is latched into the neutral retaining configuration and the shifting element is moved.

10. The detent device according to claim 1, further comprising a sensor associated with the second latching detent element, the sensor configured to detect a position of the second latching detent element.

11. The detent device according to claim 1, wherein the detent device comprises a two-position cylinder configured to control displacement of the shifting element between the first end-position retaining configuration and the second end-position retaining configuration, wherein the neutral retaining configuration is located along the two-position cylinder between the first end-position retaining configuration and the second end-position retaining configuration.

12. A transmission comprising:
a shifting arrangement for shifting the transmission between at least a first shifting condition and at least a second shifting condition, such that the shifting arrangement comprises a detent device having a shifting element, a first end-position retaining configuration arranged at a first position on the shifting element, a second end-position retaining configuration arranged on the shifting element at a second position different from the first position, and a neutral retaining configuration arranged on the shifting element at a third position different from the first position and the second position;
a first latching detent element configured, depending on a position of the shifting element, to latch with interlock either at a first end position of the shifting element in the first end-position retaining configuration or at a second end position of the shifting element in the second end-position retaining configuration; and
a second latching detent element different from the first latching detent element and configured to latch with interlock in the neutral retaining configuration when the shifting element is in a neutral position,
wherein the neutral retaining configuration has a retaining contour that is different from the first end-position retaining configuration and from the second end-position retaining configuration.

13. The transmission according to claim 12, wherein the shifting arrangement of the transmission is configured to shift an automated transmission, a range group or a splitter group of a group transmission, or a respective reversing gear shift, into a neutral position.

14. A detent device for a transmission comprising:
a shifting element defining a longitudinal axis and being axially movable along the longitudinal axis to first and second end positions and a neutral position;
a first retaining configuration having a first retaining contour and being arranged at a first axial position on the shifting element;
a second retaining configuration having a second retaining contour and being arranged at a second axial position on the shifting element;
a neutral retaining configuration having a third retaining contour and being arranged at a third axial position on the shifting element, the first, the second and the third axial positions on the shift element being axially offset from each other along the longitudinal axis, and the third retaining contour that is different from the first retaining contour and from the second retaining contour;
a first latching detent element being laterally movable relative to the longitudinal axis and received within the first retaining configuration, when the shifting element is in the first end position, to retain the shifting element in the first end position, and the first latching detent element being received within the second retaining configuration, when the shifting element is in the second end position, to retain the shifting element in the second end position; and
a second latching detent element being different from the first latching detent element and laterally movable relative to the longitudinal axis, the second latching detent element being received within the neutral retaining configuration, when the shifting element is in the neutral position, to retain the shifting element in the neutral position.

15. The detent device according to claim 14, wherein the shifting element has an outer surface, the first retaining configuration is a first depression in the outer surface, the second retaining configuration is a second depression in the outer surface, and the neutral retaining configuration is a third depression in the outer surface, wherein the first, the second and the third depressions in the outer surface of the shifting element are oriented such that the first latching detent element is prevented from being received within the third depression and the second latching detent element is prevented from being received within the first and the second depressions.

16. The detent device according to claim 15, wherein the first depression and the second depression are arranged at one orientation about a circumference of the outer surface and the third depression is arranged at another orientation about the circumference of the outer surface that is either 90 degrees or 180 degrees from the one orientation of the first and the second depressions about the circumference of the outer surface.

* * * * *